United States Patent [19]

Guiglini

[11] Patent Number: 4,601,001
[45] Date of Patent: Jul. 15, 1986

[54] INVALIDATION ARRANGEMENT FOR INFORMATION STORED IN A MEMORY DURING A CERTAIN PERIOD OF TIME AND RADAR COMPRISING SUCH AN ARRANGEMENT

[75] Inventor: Jean-Yves M. Guiglini, Argenteuil, France

[73] Assignee: U.S. Philips Corporation, New York, N.Y.

[21] Appl. No.: 375,148

[22] Filed: May 5, 1982

[30] Foreign Application Priority Data

May 15, 1981 [FR] France .................. 81 09713

[51] Int. Cl.4 .............. G11C 15/00; G11C 29/00; G01S 7/04
[52] U.S. Cl. .................. 364/518; 343/5 VQ
[58] Field of Search ............. 340/750, 715, 825.26, 340/814, 825.27; 343/5 DP; 364/518, 521, 200 MS File, 900 MS File; 365/218, 222; 367/60, 62; 371/61, 62

[56] References Cited

U.S. PATENT DOCUMENTS 3,129,426 4/1964 Altovsky et al. .............. 343/7.7
3,882,502 5/1975 Peabody et al. .............. 343/5 DP X
4,271,402 6/1981 Kastura et al. ............... 340/518 X

*Primary Examiner*—Nelson Moskowitz
*Assistant Examiner*—Gilberto Barrón, Jr.
*Attorney, Agent, or Firm*—Robert J. Kraus

[57] ABSTRACT

An invalidation arrangement (30) is provided to invalidate information stored during cyclically-occurring predetermined periods of time in a main memory (1) to which read addressing circuits (15), write addressing circuits (13) and a read-write control circuit (9) are connected. This arrangement is formed by an invalidation rate generator (35) producing signals whose period corresponds to the said certain period of time, two invalidation memories (37 and 38) whose addressing inputs are coupled to the read and write addressing circuits, a write circuit (45, 46) associated with the read-write control circuit for writing an up-dating signal into the two invalidation memories at the same time the main memory is written in, an erasing circuit (50-35-52-45-46) controlled by the invalidation generator for alternately writing an erase signal into the two invalidation memories after the predetermined period of time, and an erase signal coincidence circuit (55) connected to the outputs of the invalidation memories for controlling an invalidation circuit (60) connected to the output of the main memory.

4 Claims, 16 Drawing Figures

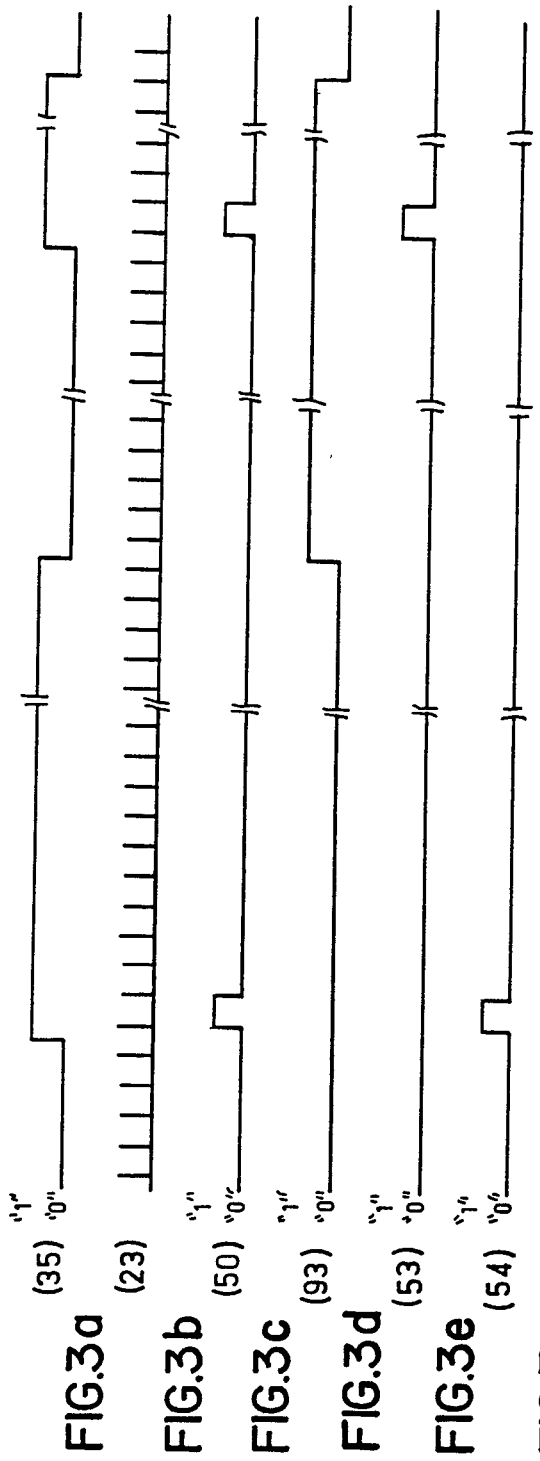

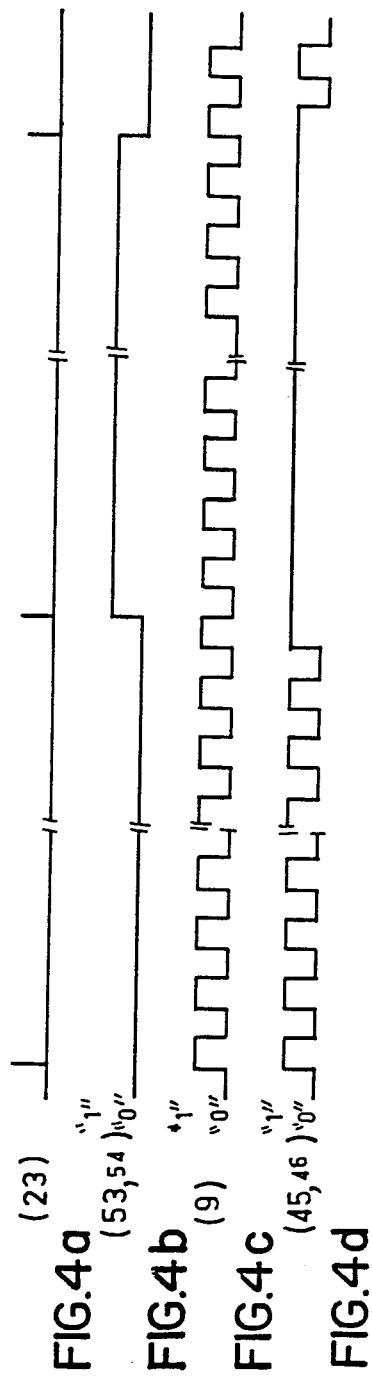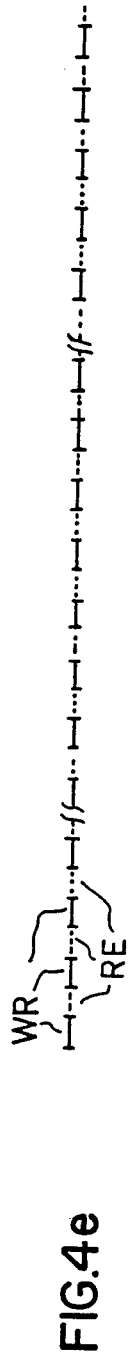

INVALIDATION ARRANGEMENT FOR INFORMATION STORED IN A MEMORY DURING A CERTAIN PERIOD OF TIME AND RADAR COMPRISING SUCH AN ARRANGEMENT

BACKGROUND OF THE INVENTION

The invention relates to an invalidation arrangement for information stored for a predetermined period of time in a main memory to which read addressing circuits, write addressing circuits and a read-write control circuit are connected.

Such an arrangement is generally known and may be used with main displays where information stored in a memory during a period of time includes information stored during a predetermined portion of the time which is invalid.

SUMMARY OF THE INVENTION

The invention has for its object to provide an invalidation arrangement which is both simple and effective.

An arrangement of the type described in the opening paragraph, is according to the invention characterized in that it comprises an invalidation rate generator producing signals whose period corresponds to the predetermined portion of the period of time, two invalidation memories whose addressing inputs are coupled to the read and write addressing circuits, a write circuit associated with the read-write control circuit for writing an up-dating signal into the two invalidation memories at the same time that the main memory is written, an erase circuit controlled by the invalidation generator for writing an erase signal alternately in one of the invalidation memories after the predetermined period of time, and an erase signal coincidence circuit, which is connected to the output of the main memory.

In one embodiment of the invention, a radar device comprising such an invalidation arrangement further comprises a transmission portion for transmitting high-frequency pulses by means of a mobile antenna means to which a position detector is coupled, a receiving portion for receiving by means of the antenna means the pulses after reflection from obstacles, a picture store for storing the pulses in defined locations by means of the position detector, and a display circuit to supply to a cathode ray picture tube information obtained from the memory at a rate necessary to obtain a proper display. In the radar device embodiment, the picture store forms the main memory.

Radars of this type do not require long-persistence cathode-ray tubes, because reading the picture store at a fast rate makes it possible to display a picture having good luminescence.

The invalidation arrangement enables a radar device to selectively produce either a circular scan or a scan of sectors having any arbitrary angles or axes. The zones not scanned need not be displayed on the screen of the cathode-ray tube.

BRIEF DESCRIPTION OF THE DRAWING

The following description, which is given by way of non-limitative example with reference to the accompanying figures, will make it better understood how the invention can be put into effect:

FIGS. 3a thru 3f show, for low-rate signals, a time diagram employed to explain the operation of the invalidation arrangement in accordance with the invention;

FIGS. 4a thru 4e show, for high-rate signals, a time diagram employed to explain the operation of the invalidation circuit in accordance with the invention;

DESCRIPTION OF THE PREFERRED EMBODIMENTS

Figure 1:
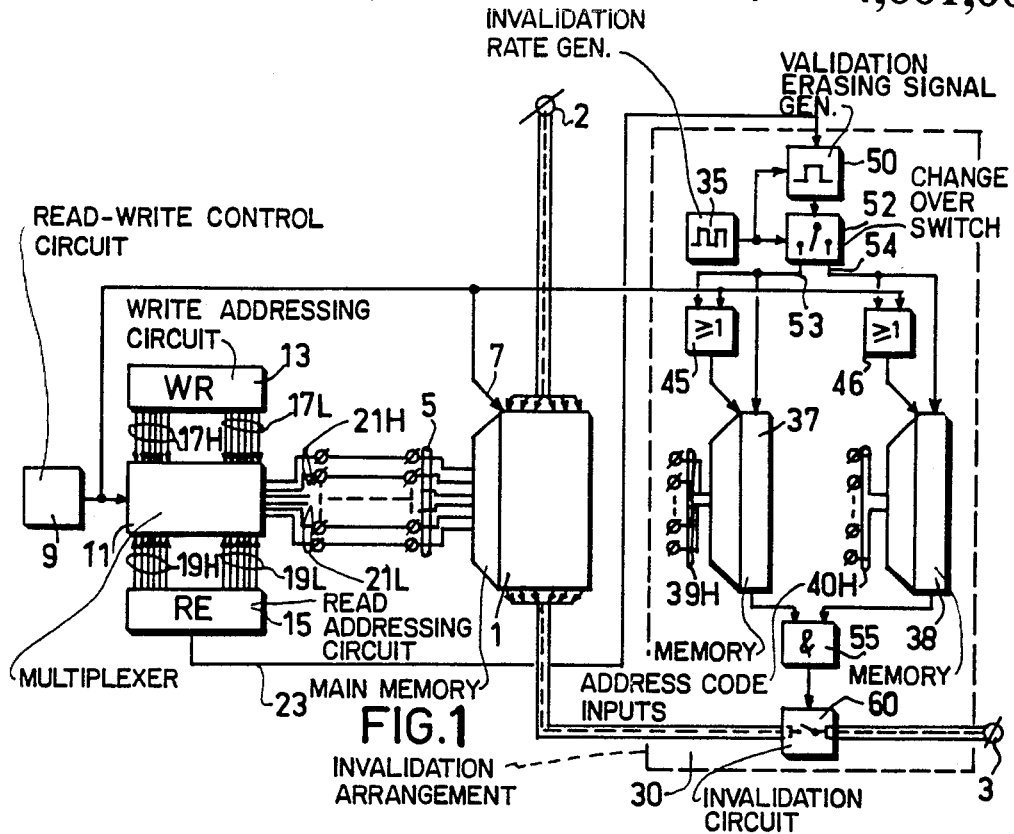
FIG. 1 shows an invalidation arrangement in accordance with the invention.

In FIG. 1, reference numeral 1 denotes a main memory intended to store data applied to an input terminal 2 and to be recovered on a terminal 3. This memory 1 is provided with an input assembly 5 for addressing codes and a read-write control 7. This write/read control 7 is connected to the output of a read-write control circuit 9, which also applies its control signals to a multiplexer 11. The first inputs of this multiplexer 11 are connected to the outputs of a write addressing circuit 13 and the second inputs are connected to the outputs of a read addressing circuit 15. When the circuit 9 supplies a certain logic signal, for example "1", the main memory is adjusted to its write mode and the code supplied by the write addressing circuit 13 is made available at the outputs of the multiplexer 11. When the circuit 9 supplies the opposite logic signal "0", the main memory 1 is adjusted to the read position and in its turn the code supplied by the read addressing circuit 15 is made available at the outputs of the multiplexer. The address codes supplied by the circuit 13 appear on two groups of wires 17L and 17H. The wires 17H convey the most significant binary elements of the address code, while the wires 17L convey the least significant elements. In a similar manner the address codes supplied by the read addressing circuit appear on two groups of wires 19L and 19H, the wires 19H conveying the most significant binary elements and the wires 19L the least significant binary elements.

Actually, there are two types of active random access memories: the memories which receive the address code on a number of wires equal to the number of binary elements forming this code and the multiplexed address memories. For these latter memories, the address code is applied twice, the number of wires is reduced to half.

If the memories used receive the code address without multiplexing, the number of output wires of the multiplexer will be equal to the number of wires of each of its inputs (17 and 19) as a result of which the two groups of wires will be connected to the inputs 5 of the memory 1.

If the memories used have a multiplexed addressing, the multiplexer 11 will be designed to supply the address code in two runs. There is no reason to distinguish between the groups of wires 21H and 21L, all the wires 21 are connected to the inputs 5 of the memory 1.

On a wire 23 the read addressing circuit 15 supplies an end-of-reading signal for the memory 1. If the circuit 15 is in the form of a counter, the wire 23 will be connected to the output on which the end-of-counting signal is made available.

The invalidation arrangement in accordance with the invention, which is denoted by reference numeral 30 in FIG. 1, serves to invalidate at the output of the memory 1 the data which are considered as having been stored during a predetermined period of time which is considered to be too long.

To this end, the invalidation arrangement 30 is formed by an invalidation rate generator 35, which produces signals whose period correspond to the predetermined period of time, and two memories 37 and 38 of the type referred to as invalidation memories whose address code inputs 39H for the first memory and 40H for the second memory are connected to the wires 21 (when memories which require a time-division multiplex addressing is used the total number of address wires is used; if this is not the case only the wires 21H are connected to the inputs 39H and 40H).

The invalidation arrangement 30 is also formed by a write circuit comprising the OR-gates 45 and 46 having two inputs, a first input of each being connected to the output of the circuit 9, and the respective outputs being connected to control inputs of memories 37 and 38 for selectively adjusting them to the write or read mode. The invalidation arrangement is further formed by an erasing circuit comprising a validation erasing signal generator 50 which produces a signal of a certain logic value (in this example a logic "1"), a change-over switch 52 having outputs 53 and 54 to apply this validation erasing signal alternately to data inputs of the memories 37 and 38 and through the respective OR-gate 45 or 46 to force the invalidation memory which receives this signal to the write position for the duration of this validation signal. This forcing action is effected by means of the OR-gates 45 and 46, the second input of these gates 45 and 46 being connected to the outputs 53 and 54. Finally, the circuit 30 is formed by a coincidence circuit for erasing signals supplied by the memories 37 and 38; this circuit is formed by an AND-gate 55 for controlling an invalidation circuit 60 which is connected to the output of the memory 1. This circuit 60 which is formed by logic circuit is designed to supply at its output "0" signals when it is activated.

Figure 2:
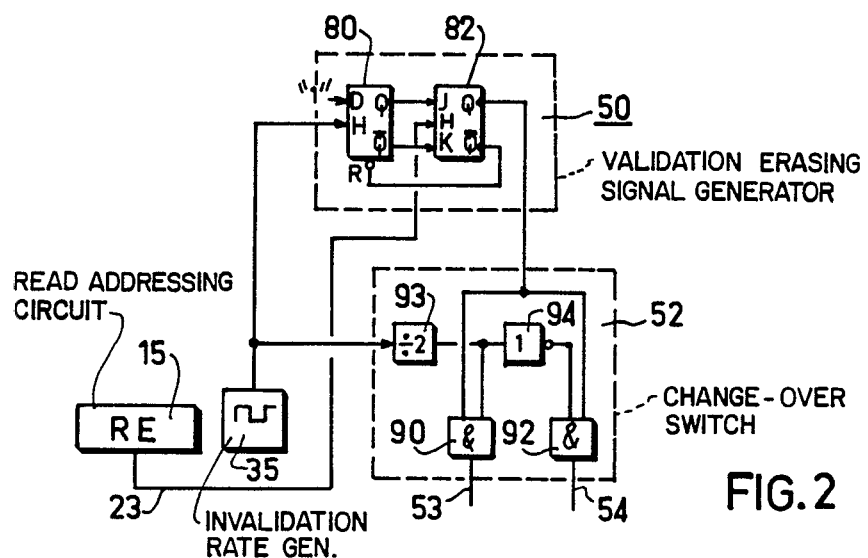
FIG. 2 shows in detail a portion of the invalidation circuit in accordance with the invention.

FIG. 2 shows in greater detail the generator 50 and the circuit 52. The validation erasing signal generator 50 is formed by two bistable trigger circuits 80 and 82; the bistable trigger circuit 80 is a D-type flip-flop, while the bistable trigger circuit 82 is a JK-type flip-flop. The input D of the bistable trigger circuit 80 permanently receives the logic signal "1"; the outputs Q and $\overline{Q}$ of the first-mentioned bistable trigger circuit are connected to the inputs J and K of the bistable trigger circuit 82, respectively, the output Q of the bistable trigger circuit 82 is connected to the input of the change-over switch 52, while the output $\overline{Q}$ is connected to the reset-to-zero input R of the bistable trigger circuit 80. The clock pulse input H of these bistable trigger circuits 80 and 82 are connected to the output of the invalidation rate generator 35 and to the wire 23, respectively.

The generator 50 operates in the following manner. Let is be assumed that the values of the logic signals at the outputs of the bistable trigger circuits 80 and 82 are "0", and that the bistable trigger circuits 80 and 82 are triggered by the ascending edges of the signals. When the signal at the output Q of the bistable trigger circuit 80 is "0", the ascending edges of the signals applied to the input H of the bistable trigger circuit 82 have no effect on the output signal of the last-mentioned bistable trigger circuit.

When an ascending signal edge is applied to the input H of the bistable trigger circuit 80, the signal at the output Q becomes also equal to "1", so that from the moment a signal having an ascending edge appears on the wire 23, the signal at the output of the bistable trigger circuit 82 takes the value "1"; in addition, the bistable trigger circuit 80 is reset to the "0" state, such that, at the next ascending edge of the signal at the output of the circuit 15 this bistable trigger circuit will be reset to the "0"-state.

The change-over circuit 52 is in the form of two AND-gates 90 and 92, whose outputs form the outputs 53 and 54 of this circuit 52. A first input of the gate 90 is connected to the output of a divide-by-two frequency divider denoted by reference numeral 93 and also to an input of an inverter 94, whose output is connected to a first input of the gate 92. The input of the divider 93 is connected to the output of the generator 35. The second inputs of the gates 90 and 92 are connected to the output of the generator 50.

It is now possible to describe how the arrangement in accordance with the invention operates. The read-write control circuit 9 supplies the signals at a fast rate of the order of some microseconds, while the period of the signals of the invalidation generator is of the order of some seconds. To explain the operation, reference is made to the FIGS. 3 and 4, which are time diagrams. The time diagram shown in FIG. 3 is referenced to the rate of the invalidation generator, while the time diagram of FIG. 4 is referenced to the rate of the read-write control circuit 9. These FIGS. 3 and 4 show in parenthesis beside each line, the reference numeral of the element which is acted upon by the respective signal.

The line a of FIG. 3 illustrates the invalidation rate, that is to say that in this line a there is shown the shape of the signals produced by the generator 35. As mentioned in the foregoing, these signals have a period of several seconds; a period of time equal to twice this period fixes the invalidation time. If during this time no writing is effected in a zone of the memory defined by the most significant data of the code for the case of a memory 1 which does not require a time-division multiplex addressing code, the information contained in this zone during reading will be invalidated. The vertical lines shown at line b represent the end-of-read signals which are produced by the read addressing circuit 15 and are made available on the wire 23. Between the appearance of two signals on the wire 23, the address code on the wires 19H and 19L has assumed all the possible configurations during the periods of time in which the signal produced by the generator 9 controls the read position. The signal c represents the output signal of the validation erasing generator 50; this signal has a "1" logic level during a period of the end-of-read signals (line b, FIG. 3) after each ascending edge of the signals produced by the generator 35. The line d represents the output signal of the frequency divider 93 (FIG. 2). This signal changes its value at each descending edge of the signal from generator 35. The value of the output signal of the divider 93 determines which one of the gates 90 and 92 is made conductive. Thus, when this signal has the value "0", the validation erasing pulse intended for the memory 38 will appear on the wire 54 (line f, FIG. 3) and when it has a value "1" the pulse for the memory 37 will appear on the wire 53 (line e, FIG. 3).

At the line a of FIG. 4 there is again shown, but at a much wider time scale, the signals present on the wire 23 and in the same manner, at the line b, the signals present on the output 53 (or 54, respectively); at the line c, the fast-rate signals shown are the signals produced by the read-write control circuit 9. When the signal is at the "1" level, the memories are adjusted to the write position and when the signal is at the "0" level the memories are adjusted to the read position. To show these different positions clearly, the periods of time in which writing can be effected are indicated by means of solid line sections referenced WR and by dotted-linesections referenced RE the period of times during which reading is effected (line e).

At line d of FIG. 4 the signal coming from the gate 45 (or 46) controls the write or read mode of the memory 37 (38). When the signal on the output 53 is at the "0" level, the memory 37 is adjusted to either the read or the write mode, the same as the main memory 1; so each time new data is written in the memory 1 an up-dating signal (a "0") is written in the corresponding zone of the memory 37. In contrast therewith, when the signal on the wire 53 has the logic value "1", the signal at the output of the gate 45 assumes the value "1" and adjusts the memory 37 to the write mode. It remains in the write mode for the period of time the read address code on the wires 19H and 19L assumes all the possible configurations. So, when the signal at the output 53 again assumes the value "0", the logic value "1" has been written in its totality in the memory 37. Thus, all the locations of the memories 37 and 38 which correspond to the zones of the memory 1 in which no writing has been effected between two appearances of a signal "1" at the output of the generator 50 simultaneously contain a data representing a logic "1" after the second appearance. The gate 55 will detect, during reading of the zones of the memory 1, the coincidence of two "1" at the outputs of the memory 37 and 38 and will control the activation of the invalidation circuit 60.

Figure 5:
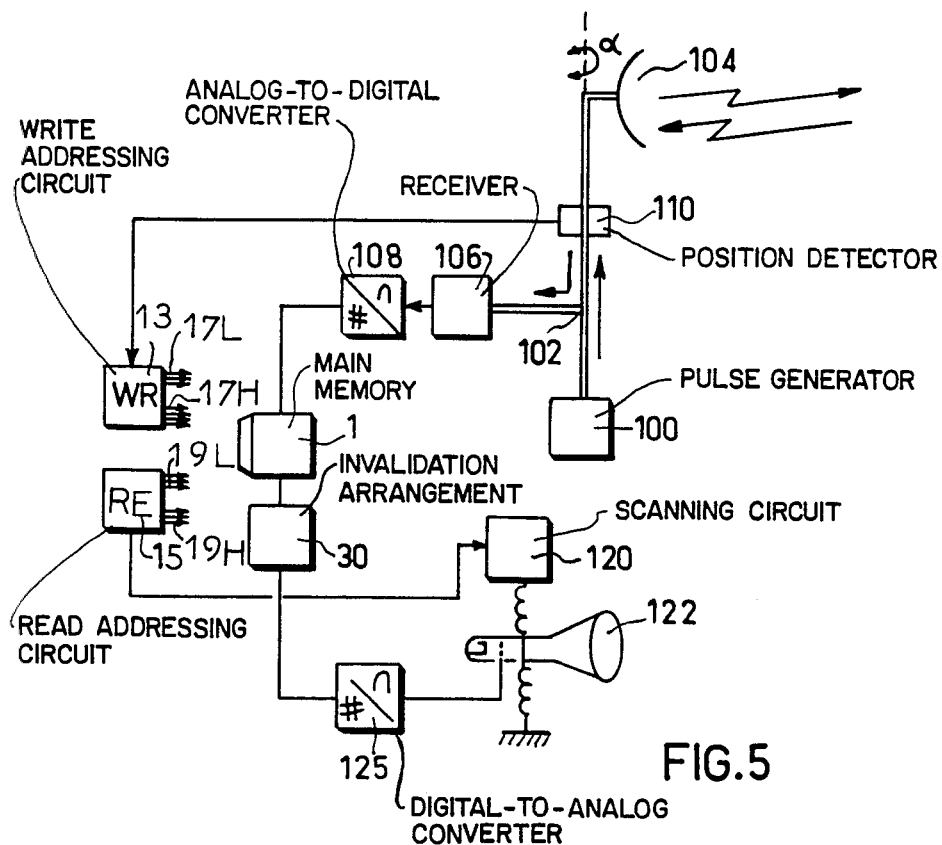
FIG. 5 shows a radar arrangement in accordance with the invention.

The invention also relates to be radar comprising such an invalidation arrangement 30. FIG. 5 shows an example of such a type of radar. This radar is in the form of a radar pulse generator 100 for applying high-frequency wave pulses, such as very high frequency pulses, by means of a duplexer 102, to an antenna 104. The wave transmitted by the antenna 104 is reflected from different obstacles, and is thereafter picked-up by this same antenna 104. A receiver 106 receives this wave coming from the antenna 104 and passing through the duplexer 102. The receiver 106 supplies at its output a signal whose amplitude depends on the intensity of the received wave. This signal is converted into a digital code by means of an analog-to-digital converter 108 for storage in the memory 1. A position detector 110 measures the angle of rotation α of the antenna 104. The output of the detector is connected to the write addressing circuit 13 so as to ensure that the digital code at the output of the converter is adequately stored. The read addressing circuit 15 cooperates with a scanning circuit 120 which makes it possible to scan a cathode-ray tube 122. To have the luminance of the spot of the cathode-ray tube vary, its grid is connected to the output of a digital-to-analog converter 125 whose input is connected to the output of the memory 1 by means of the invalidation arrangement 30.

Figures 6A, 6B:
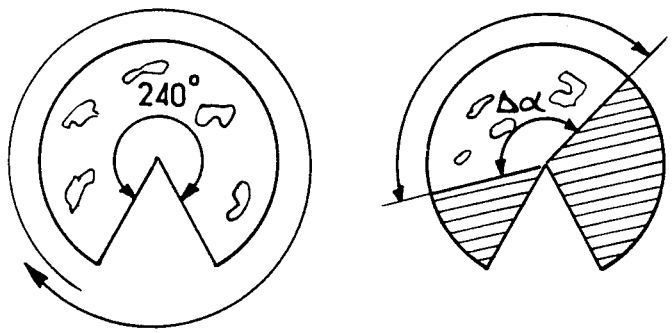
FIGS. 6a and 6b show schematically the appearance of displayed pictures of two different scans.

Such a radar operates in the following manner. Let it first be assumed that the antenna has a uniform circular sweep; this is shown in FIG. 6a. The cathode-ray tube must show the whole field explored within the limit of a useful sector (for example 240°). The data concerning this useful sector are stored in the entire memory 1.

As a result of the digital signal processing, the field explored is divided into discrete segments of circle, so that, for each of these values, there is a corresponding processing of the reflected wave applied the receiver 106. The write addressing circuit 13 supplies on the wires 17H a code corresponding to the segment of circle which defines a radian vector, while the code on the wires 17L corresponds to the position of a segment in the radian vector. Each vector is defined by a word in the main memory. The address code thus formed allows the several intensities of the received echoes to be stored for the different points of the sector. The echoes received for one single discrete value are stored segmentwise in the memory 1 during the periods of time WR (see line e of FIG. 4). The entire memory 1, on the other hand, is read during the period of time RE; thus it is possible to make the rate at which the picture is displayed on the cathode-ray tube 122 much higher than the field exploring rate.

To understand the importance of the invalidation arrangement 30, let is now be assumed that the scanning operation is effected for a segment having an angle $\Delta\alpha$; this is shown in FIG. 6b. The invalidation arrangement 30 will then operate such that it ensures that on the tube screen no echo will appear in the zones between the useful sector of 240° and the segment of the angle $\Delta\alpha$. This is shown by means of hatched portions in FIG. 6.

What is claimed is:

1. In an apparatus for sequentially storing digital information including invalid information received during cyclically-occurring periods of predetermined duration, said apparatus including an addressable main memory, a read/write control circuit coupled to the main memory for alternately producing read and write control signals, a main memory input for sequentially applying digital information to the main memory, a write addressing circuit coupled to the main memory for sequentially specifying addresses into which the digital information sequentially applied to the input is to be stored during the occurrence of respective ones of the write control signals, a main memory output for sequentially receiving digital information from the main memory, and a read addressing circuit coupled to the main memory for sequentially specifying addresses from which the stored digital information is to be sequentially read during the occurrence of respective ones of the read control signals, the improvement comprising an invalidation arrangement including:
(a) an invalidation rate generator means for producing signals simultaneously with said cyclically-occurring periods of predetermined duration;
(b) first and second invalidation memories, each having storage addresses corresponding to those in the main memory, and each coupled to the read and write addressing circuits;
(c) a write circuit coupled to respective inputs of the first and second invalidation memories and to the read/write control circuit, for alternately selecting the first and second invalidation memories during successive ones of the signals produced by the invalidation rate generator, and for effecting writing of a predefined updating value into addresses of the selected invalidation memory simultaneously with the writing of digital information into corresponding addresses of the main memory;

(d) an erase circuit coupled to the read addressing circuit, to the invalidation rate generator and to the write circuit for writing a predefined erase value into all of the addresses of the non-selected invalidation memory during each of said cyclically-occurring periods;

(e) an invalidation circuit coupled to the main memory output; and (f) an erase value coincidence circuit coupled to respective outputs of the first and second invalidation memories and to the invalidation circuit for effecting invalidation of information read from main memory addresses corresponding to respective addresses in the first and second invalidation memories from which said coincidence circuit simultaneously receives said erase value.

2. An apparatus as in claim 1 where the digital information stored in respective addresses of the main memory comprise words having a number of bits which is larger than the number of bits forming the values stored in respective addresses of the first and second invalidation memories.

3. An apparatus as in claim 2 where said predefined updating value comprises a single bit having one of the two possible binary values and where said predefined erase value is a single bit having the other possible binary value.

4. An apparatus as in claim 1, 2 or 3 where said main memory comprises a picture store for storing at respective addresses digital information representing reflections of transmitted radar pulses successively received from different bearings, said cyclically-occurring periods of predetermined duration corresponding to a sector of bearings from which no valid reflections will be received.

* * * * *